(12) United States Patent
Trowbridge et al.

(10) Patent No.: US 11,731,460 B2
(45) Date of Patent: Aug. 22, 2023

(54) TRUCK TIRE HAVING TREAD DESIGN WITH ALTERNATING FEATURE FOR REDUCING ABNORMAL WEAR

(71) Applicant: Compagnie Generale des Etablissements Michelin, Clermont-Ferrand (FR)

(72) Inventors: Jeremy Trowbridge, Greenville, SC (US); Satish Kaithal, Gurgaon (IN); Michael Knauff, Simpsonville (SC)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 318 days.

(21) Appl. No.: 16/648,006

(22) PCT Filed: Sep. 28, 2017

(86) PCT No.: PCT/US2017/053891
§ 371 (c)(1),
(2) Date: Mar. 17, 2020

(87) PCT Pub. No.: WO2019/066839
PCT Pub. Date: Apr. 4, 2019

(65) Prior Publication Data
US 2020/0262244 A1 Aug. 20, 2020

(51) Int. Cl.
*B60C 11/00* (2006.01)
*B60C 11/03* (2006.01)
*B60C 11/12* (2006.01)

(52) U.S. Cl.
CPC ...... *B60C 11/0008* (2013.01); *B60C 11/0306* (2013.01); *B60C 11/1204* (2013.01);
(Continued)

(58) Field of Classification Search
CPC ............ B60C 11/0008; B60C 11/0306; B60C 11/1204; B60C 2011/0025;
(Continued)

(56) References Cited

U.S. PATENT DOCUMENTS 3,326,261 A * 6/1967 Roberta ................. B29D 30/54
152/176
9,358,840 B2 * 6/2016 Bijaoui ................. B60C 11/005
(Continued)

OTHER PUBLICATIONS

European Patent Office; International Search Report and Written Opinion for patent application PCT/US2017/053891 filed Sep. 28, 2017; Publisher: European Patent Office, Rijswijk, Netherlands; dated Feb. 5, 2018; pp. 1-8, enclosed.

*Primary Examiner* — Galen H Hauth
*Assistant Examiner* — Shibin Liang
(74) *Attorney, Agent, or Firm* — Neal P. Pierotti

(57) ABSTRACT

A heavy truck tire is provided that has a plurality of tread zones located at different locations in a lateral direction of the tread and configured for engaging a road. The first tread zone has a first max tan(δ), and a second tread zone located next to the first tread zone in the lateral direction has a second max tan(δ) is different than the first max tan(δ). The second tread zone is between the first tread zone and a third tread zone. The third tread zone has a third max tan(δ) that is the same as or close to the first max tan(δ). The first, second and third max tan(δ) are all within the range from 0.01-0.30. Also, either the first max tan(δ) is at least 0.05 greater than the second max tan(δ) or the second max tan(δ) is at least 0.05 greater than the first max tan(δ).

9 Claims, 4 Drawing Sheets

(52) U.S. Cl.
CPC .............. *B60C 2011/0025* (2013.01); *B60C 2011/1213* (2013.01)

(58) Field of Classification Search
CPC ............. B60C 2011/1213; B60C 11/00; B60C 11/005; B60C 1/00; B60C 11/0075; B60C 11/0058
See application file for complete search history.

(56) References Cited

U.S. PATENT DOCUMENTS

| | | | |
|---|---|---|---|
| 2012/0132332 A1* | 5/2012 | Zhao | B60C 11/00 152/209.5 |
| 2015/0328931 A1 | 11/2015 | Guerinon | |
| 2016/0214437 A1 | 7/2016 | Bourgeois | |
| 2018/0162165 A1* | 6/2018 | Ikuta | C08L 7/00 |

\* cited by examiner

TRUCK TIRE HAVING TREAD DESIGN WITH ALTERNATING FEATURE FOR REDUCING ABNORMAL WEAR

CROSS-REFERENCE TO RELATED APPLICATIONS

The present application is a 35 U.S.C. § 371 application of PCT/US17/53891 filed on Sep. 28, 2017 and entitled "Truck Tire Having Tread Design With Alternating Feature For Reducing Abnormal Wear." PCT/US17/53891 is incorporated by reference herein in its entirety for all purposes.

FIELD OF THE INVENTION

The subject matter of the present invention relates to a truck tire that has a tread design that reduces abnormal wear of the tread of the tire. More particularly, the present application involves a tread that features alternating zones of lower hysteresis material and higher hysteresis material across the lateral width of the tire to result in a truck tire that exhibits less irregular wear.

BACKGROUND OF THE INVENTION

Manufacturers of heavy commercial vehicle tires have made huge progress in developing tire architectures and tire materials that allowed them to increase the wear resistance of tire treads and reduce the rolling resistance of tires while in the same time improving their level of grip and resistance to road hazard.

Irregular tread wear (also called "uneven wear" or "abnormal wear") is a great concern for heavy commercial vehicle tires as it can progressively induce tire vibrations that become sensed by the driver through the steering wheel. It can also make for a poor looking wear pattern. Both of these undesired effects often lead to the tire being removed from service at an early stage of its wear life. Generally, the more the tire is put through a slow-wearing usage, the more irregular wear is affecting the removal mileage. This is why resistance to irregular wear is of paramount importance for truck tires in the so-called long haul steer usage.

Two examples of successful long haul steer tires on the North American market are the tires sold under the names MICHELIN® XZA3®+ EVERTREAD® and MICHELIN® X LINE™ ENERGY Z. The tread of those tires combine features that make them perform at a very good level in term of rolling resistance, wear rate, resistance to irregular wear and resistance to aggression in the long haul steer usage.

The tread of those tires use a combination of two main layers of different rubber compounds laid on top of each other. The ground contacting upper layer being a more hysteretic compound than the lower layer. This design allows the tire to be protected from wear when it is new. However, it may be desirable to have other tread designs for truck tires that seek to reduce abnormal wear. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
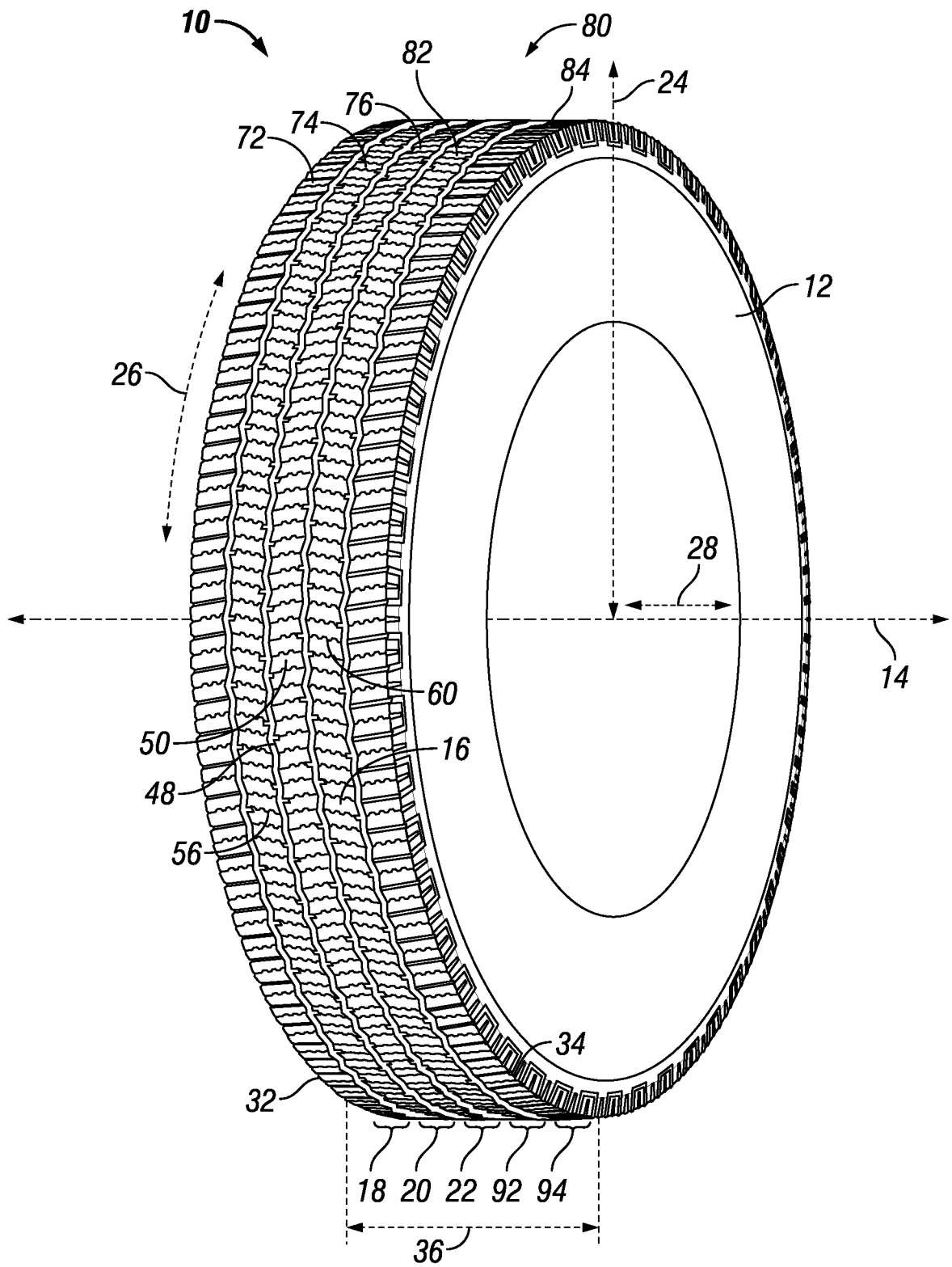
FIG. 1 is a perspective view of a heavy truck tire in accordance with one exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a heavy duty truck tire 10 that exhibits less abnormal wear due to the implementation of tread 16 that features alternating tread zones in the lateral direction 28 of the tread 16. The tread zones are alternating in that a first tread zone 18 has a hysteresis that is either higher or lower than the hysteresis of an adjacent second tread zone 20 of the tire 10 in the lateral direction 28. In turn, a third tread zone 22 adjacent to the second tread zone 20 in the lateral direction 28 has a hysteresis that is the same as or very close to the first tread zone 18. If additional tread zones 80 are present in the tread 16, this repeating pattern may take place across the width of the tread 16. This alternating approach has been found to minimize irregular wear of the tread 16. The alternating zones allow a portion of the tread 16 to be optimized for rolling resistance and resistance to heat buildup in lower hysteretic zones, and optimized for traction and wear in the higher hysteretic zones.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 12 onto which a tread 16 is disposed thereon. The central axis 14 of the tire 10 extends through the center of the casing 12, and the lateral (axial in this instance) direction 28 of the tire 10 is parallel to the central axis 14. The radial direction 24 of the tire 10 is perpendicular to the central axis 14, and the tread 16 is located farther from the central axis 14 in the radial direction 24 than the casing 12. The tread 16 extends all the way around the casing 12 in the circumferential direction 26 of the tire 10 and circles the central axis 14 360 degrees.

The tread 16 features five ribs 72, 74, 76, 82, 84 that are separated by four longitudinal grooves that extend in the circumferential direction 26. The five ribs 72, 74, 76, 82, 84 can be classified as a central rib 76, two intermediate ribs 74 and 82, and two shoulder ribs 72 and 84. However, any number of ribs, or no ribs, can be present in other exemplary embodiments and the five ribs 72, 74, 76, 82 and 84 are present in only some embodiments. The ribs 72, 74, 76, 82, 84 can each be made up of a number of tread blocks 60 that can have various shapes, sizes, and configurations. The inclusion of these architectural features gives the tread 16 different performance properties in use. The tread 16 may include certain structural features that can enhance the reduction of abnormal wear achieved through the implementation of different zones of hysteresis. One such structural feature shown with reference to FIG. 1 may be directional sipes 56 that extend across the tread blocks 60 of the ribs in the lateral direction 28. The specific sipe 56 noted in FIG. 1 is in the second rib 74. The tread 16 has a first tread edge 32 and an oppositely disposed second tread edge 34 in the lateral direction 28. The rolling tread width 36 of the tread 16 extends from one edge 32 to the other edge 34 and is the portion of the tread 16 that is designed to engage the ground when the tire 10 is new before any tread 16 wear has occurred.

Figure 2:
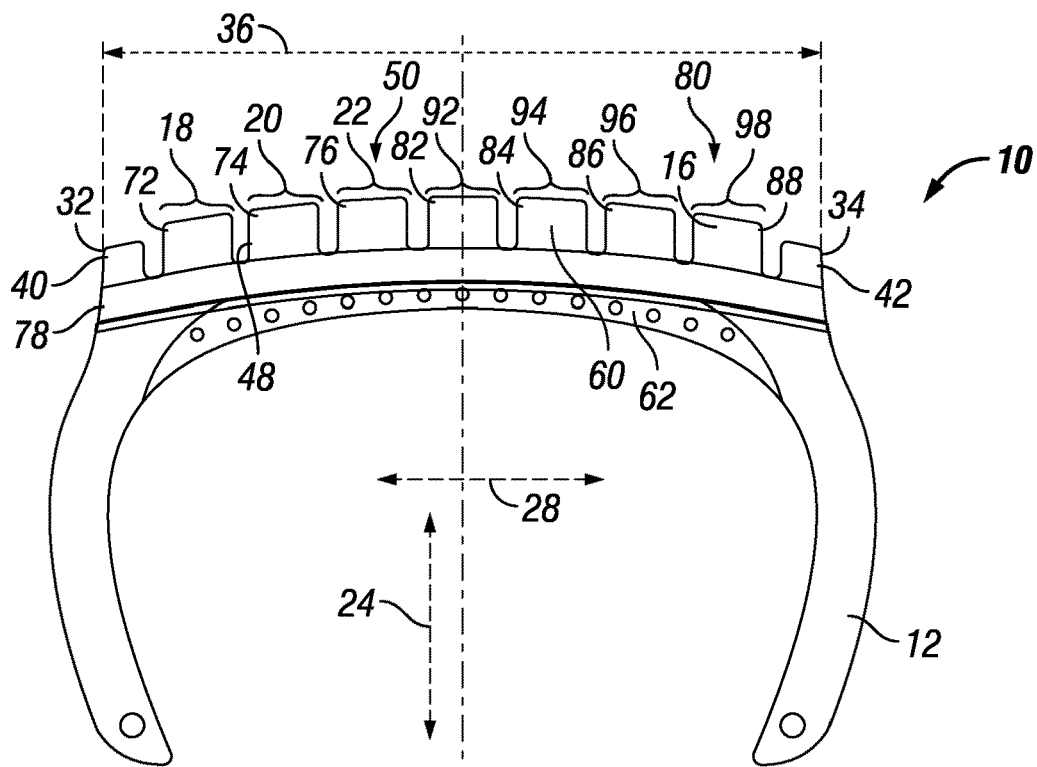
FIG. 2 is a cross-sectional view of the tire in accordance with another exemplary embodiment in which sacrificial ribs are present.

With reference now to FIG. 2, another exemplary embodiment of the tire 10 is shown in which the tread 16 is made up of tread blocks 60 located within various ribs. Seven ribs 72, 74, 76, 82, 84, 86, and 88 are illustrated, along with two sacrificial ribs 40 and 42. Various tread zones are located at each one of the ribs 72, 74, 76, 82, 84, 86, and 88. The first tread zone 18 extends across a portion of the tread 16 in the lateral direction 28 that makes up the first rib 72. In turn, the second tread zone 20 is at the second rib 74, the third tread zone 22 is at the third rib 76, the fourth tread zone 92 is at the fourth rib 82, the fifth tread zone 94 is at the fifth rib 84, the sixth tread zone 96 is at the sixth rib 86, and the seventh tread zone 98 is at the seventh rib 88. The various tread zones 18, 20, 22, 92, 94, 96, and 98 do not all have the same hysteresis values as one another. In particular, the values alternate between adjacent tread zones so that the tread zones 18, 22, 94 and 98 have the same hysteresis value, and so that tread zones 20, 92 and 96 have the same hysteresis value, and this hysteresis value is different from the first set of tread zones. Hysteresis can be measured by the tan($\delta$) value of the rubber making up the tread zone. The loss factor "tan($\delta$)" is a dynamic property of the rubber compound. It is measured on a viscosity analyzer (Metravib VA4000) according to Standard ASTM D5992-96. The response of a test specimen consisting of two cylindrical pellets each 2 mm thick and one centimeter in diameter is recorded (the test specimen is made from samples taken from a tire mid-way up the height of the zone concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 25% peak to peak (on the outbound cycle) then from 25% to 1% peak to peak (on the return cycle). The results that are used here are the loss factor tan($\delta$) and the complex dynamic shear modulus. The complex dynamic shear modulus is denoted "G*25" in reference to the 25% strain applied during the test. During the outbound cycle, the maximum value of tan $\delta$ that is observed is denoted "max tan($\delta$)".

Although described as being the same max tan($\delta$) value, the tread zones 18, 22, 94 and 98 need not be identical to one another but may be different. However, if different they are within a range of 0.05 to one another. In this regard, some of the tread zones 18, 22, 94 and 98 may have the same max tan($\delta$) value while other ones of the tread zones 18, 22, 94 or 98 have max tan ($\delta$) values that are not greater than 0.05 to one another. In a similar manner, the max tan($\delta$) values of the tread zones 20, 92, and 96 need not always be the same as one another but could be no greater than 0.05 to one another so that all of the tread zones 20, 92, 96 are either identical to one another or within a range of one another no greater than 0.05. However, even with these variations within 0.05, the set of tread zones with the higher max tan($\delta$) will still be higher than the set with the lower max tan($\delta$) so that an alternating sequence is realized across at least a portion of the tread zone, and in some cases all of the tread zones.

The max tan($\delta$) of the various tread zones may be from 0.01-0.30, and in some embodiments may be from 0.04-0.27. In accordance with certain exemplary embodiments, the max tan($\delta$) of the tread zones may be from 0.01-0.05, from 0.05-0.09, from 0.09-0.13, from 0.13-0.17, from 0.17-0.21, from 0.21-0.25, from 0.25-0.30, from 0.01-0.07, from 0.07-0.13, from 0.13-0.20, from 0.20-0.27, from 0.27-0.30, from 0.01-0.11, from 0.11-0.21, from 0.21-0.30, from 0.13-0.17, from 0.11-0.19, from 0.08-0.22, or 0.06-0.24, or from 0.07-0.27.

The tread zones are arranged in the tread 16 so that they have alternating hysteresis in the lateral direction 28, and thus have alternating max tan($\delta$) in the lateral direction 28. The tread zones are set up so that there are two sets of tread zones with all of the tread zones in the first set having the same max tan($\delta$), or a max tan($\delta$) within a 0.05 range, as the rest of the tread zones in the first set, and so that all of the tread zones in the second set have the same max tan($\delta$), or a max tan($\delta$) within a 0.05 range, as the rest of the tread zones in the second set. The first and second sets have different max tan($\delta$) so that one of the sets has a higher max tan($\delta$) than the other set. In order to have the alternating sets of max tan($\delta$), at least three tread zones 18, 20, 22 must be present, however any additional number of tread zones can be included in accordance with other exemplary embodiments. In some embodiments, all of the surface of the tread 16 that engages the ground/road features tread zones having alternating max tan($\delta$) in the lateral direction 28. Here, the entire ground engaging surface in the rolling tread width 36, such as all of the ribs on the tread 16, are part of the alternating max tan($\delta$) pattern.

The alternating tread zones may be set up, for example, so that the first tread zone 18 has a lower max tan($\delta$) than the adjacent second tread zone 20 which has a higher max tan($\delta$). The third tread zone 22 adjacent to the second tread zone 20 has the same max tan($\delta$) as the first tread zone 18 or one close to it, which is of course lower than the max tan($\delta$) of the second tread zone 20. The fourth tread zone 92 again alternates from the third thread zone so the max tan($\delta$) of the fourth tread zone 92 is the same as the second tread zone 20, or close to it, and is higher than the first and third tread zones 18, 22. This alternating pattern may continue with the fifth tread zone 94, the sixth tread zone 96, and the seventh tread zone 98 across the tread 16. In this regard, the first, third, fifth, and seventh tread zones 18, 22, 84 and 88 may all have the same max tan($\delta$) or one within 0.05, and this max tan($\delta$) is lower than the max tan($\delta$) of the second, fourth, and sixth tread zone s 20, 92 and 96 which all have the same max tan($\delta$), or one within 0.05.

The tread zones are thus organized into a set with a higher max tan($\delta$) and a set with a lower max tan($\delta$). In some embodiments, the higher tread zones with higher max tan($\delta$) are at least 0.05 greater than the max tan($\delta$) of the lower tread zones. In other embodiments, the higher tread zones have a max tan(δ) at least 0.08 greater than the max tan(δ) of the lower tread zones. In still further embodiments, the max tan(δ) of the higher tread zones is at least 0.10 greater than the max tan(δ) of the lower tread zones. The higher tread zones may be capped in various embodiments relative to the lower tread zones so that the max tan(δ) of the higher tread zones is not greater than 0.21 above the max tan(δ) of the lower tread zones.

The complex shear modulus for 25% strain (G*25) at 60° C., referred to herein as G*25, may be selected so that it is the same or different for the higher and lower tread zones. In some instances, the G*25 for the lower max tan(δ) tread zones is the same as the max tan(δ) of the higher tread zones. In other embodiments, the G*25 for the lower max tan(δ) tread zones is within 0.10 MPa of G*25 of the higher tread zones. In other instances, the G*25 for the tread zones with the lower max tan(δ) is less than the G*25 for the tread zones of the higher max tan(δ). In yet further exemplary embodiments, the G*25 of the tread zones with the higher max tan(δ) is greater than the G*25 of the tread zones with the lower max tan(δ). In some embodiments, the G*25 of the tread zones with the higher max tan(δ) and the tread zones with the lower max tan(δ) is from 1.10-2.30 MPa. In other embodiments, the G*25 of the lower and upper tread zones is from 1.24-2.29 MPa. In yet other embodiments, the G*25 of the tread zone with the lower max tan(δ) and the tread zone with the upper max tan(δ) is from 1.20-1.40 MPa, from 1.40-1.60 MPa, from 1.60-1.80 MPa, from 1.80-2.00 MPa, from 2.00-2.20 MPa, from 2.20-2.30 MPa, from 1.20-1.50 MPa, from 1.50-1.80 MPa, from 1.80-2.10 MPa, from 2.10-2.30 MPa, from 1.20-1.60 MPa, from 1.60-2.00 MPa, from 2.00-2.30 MPa, from 1.40-2.10 MPa, from 1.50-2.00 MPa, from 1.60-1.90 MPa, from 1.70-1.80 MPa, from 1.30-1.50 MPa, from 1.80-2.30 MPa, from 1.70-2.00 MPa, from 1.70-2.30 MPa, from 1.20-1.70 MPa, from 1.50-1.70 MPa, from 1.30-1.70 MPa, from 1.10-1.15, from 1.10-1.20, from 1.10-1.70, from 1.10-2.50, or from 1.40-1.70 MPa.

The entire first rib 72 can be made of the first tread zone 18, and the rest of the ribs in turn can be made completely of their respective tread zones. An undertread layer 78 lays under the ribs 72, 74, 76, 82, 84, 86 and 88 and tread zones 18, 20, 22, 92, 94, 96 and 98 in the radial direction and does not form part of the tread zones 18, 20, 22, 92, 94, 96 and 98. The undertread layer 78 can have a hysteresis that is the same as or different than the hysteresis of the ribs 72, 74, 76, 82, 84, 86 and 88. In some embodiments, the max tan(δ) of the undertread layer 78 is the same as that of the lowest max tan(δ) of the tread zones 18, 20, 22, 92, 94, 96 and 98. In other embodiments, the max tan(δ) of the undertread layer 78 is less than the max tan(δ) of any of the tread zones 18, 20, 22, 92, 94, 96 and 98. The tread zones extend along the entire width of the rolling tread width 36 in the lateral direction 28. The tread zones in FIG. 2 do not form a continuous footprint across the entire rolling tread width 36 but are separated and discontinuous from one another at the longitudinal grooves between ribs, and at the sacrificial ribs 40, 42 that are at the opposite ends of the rolling tread width 36. The sacrificial ribs 40, 42 in the embodiment shown do not include any of the tread zones 18, 20, 22, 92, 94, 96 and 98 and can have a hysteresis that is the same as or different from that of any of the tread zones 18, 20, 22, 92, 94, 96 and 98.

The alternating sequence can be different in other embodiments in that the first tread zone closest to the shoulder has a higher max tan(δ) than the max tan(δ) of the tread zone of the next adjacent tread zone. The max tan(δ) alternates between tread zones across the width of the tread 16 in the lateral direction 28, but instead of starting out on one side with the lower max tan(δ), the higher max tan(δ) begins on the one side of the tread 16 first followed by the lower, then higher, and so forth. Alternating zones are still present across the rolling tread width 36, but it is to be understood that either the higher or lower max tan(δ) tread zones may be located on one side of the rolling tread width 36 in the lateral direction 28.

If an even number of tread zones are present in the tread 16, then the tread zone closest to the first tread edge 32 has a max tan(δ) different than (higher or lower) the max tan(δ) of the tread zone closest to the second tread edge 34. Also, if an odd number of tread zones are present in tread 16, the max tan(δ) of the tread zone closest to the first tread edge 32 will be the same as the max tan(δ) of the tread zone closest to the second tread edge 34.

Additional elements of the tire 10 include a belt layer 62 that is located under the undertread layer 78 such that the undertread layer 78 is located outward from the belt layer 62 in the radial direction 24. The undertread layer 78 may be devoid of belts, and the belt layer 62 can instead have belts located therein. The tire 10 also has a casing 12 that features a pair of sidewalls and beads. The casing 12 and the belt layer 62 may have a hysteresis different than that of the tread zones 18, 20, 22, 92, 94, 96 and 98 such that the max tan(δ) of the casing 12 and the belt layer 62 is not the same as the max tan(δ) of any one of the tread zones 18, 20, 22, 92, 94, 96 or 98.

It is to be understood that at least three of the alternating tread zones 18, 20, 22 are present in the rolling tread width 36. However, other zones, ribs, and other features of the tread 16 can be present in the rolling tread width 36 that do not have an alternating hysteresis associated with the alternating max tan(δ) of the tread zones 18, 20, 22. Further, although shown in the embodiment in FIG. 2 as being proximate the shoulder of the tire 10, it is to be understood that the alternating tread zones 18, 20 and 22 may be at the center of the rolling tread width 36 in the lateral direction 28 or at any other location in the rolling tread width 36 in accordance with other exemplary embodiments. Since at least three of the alternating tread zones 18, 20, 22 are present, the remaining tread zones 92, 94, 96, 98, 100, 102, etc., which can be of any number, may be referred to as additional tread zones 80.

The ribs into which the tread zones are located can be arranged so that the first rib 72 is distinct from the second rib 74. The ribs are defined as the portion of the tread 16 that starts at the bottom of the adjacent longitudinal groove(s) and extends away from the central axis 14 in the radial direction 24. In FIG. 2, all of the ribs include their own respective tread zone. However, it is to be understood that the tread zone may span over two, three, or more adjacent ribs in other embodiments. For example, the first tread zone 18 may be located at both the first rib 72 and second rib 74. Likewise, the second tread zone 20 can be located at the third rib 76 and fourth rib 82, and the third tread zone 22 may be located at the fifth rib 84 and sixth rib 86. The boundary lines between the tread zones 18, 20, 22, 92, 94, 96 and 98 may be at any location on the tread 16 in the lateral direction 28 and they may all be of the same width in the lateral direction 28, or the tread zones 18, 20, 22, 92, 94, 96 and 98 may have different widths from one another in the lateral direction 28. With respect to the radial direction 24, the tread zones are bounded on their lower sides by the upper end of the undertread layer 78. In other embodiments, the tread zones 18, 20, 22, 92, 94, 96 and 98 are bounded on their lower ends by various portions of the ribs 72, 74, 76, 82, 84, 86 and 88 into which the tread zones 18, 20, 22, 92, 94, 96 and 98 are located so that they form some, but not all of, the ribs 72, 74, 76, 82, 84, 86 and 88. These other sections of the ribs 72, 74, 76, 82, 84, 86 and 88 have a hysteresis and a max tan($\delta$) that is different from the tread zones 18, 20, 22, 92, 94, 96 and 98 within the ribs 72, 74, 76, 82, 84, 86 and 88.

One experiment was conducted in accordance with the present disclosure in which alternating zones across the rolling tread width 36 were utilized such that the lower max tan($\delta$) of the tread zones was 0.07, and the higher max tan($\delta$) of the tread zones was 0.24. The G*25 of all of the lower max tan($\delta$) tread zones was about the same (within 0.05 MPa) as that of the higher max tan($\delta$) tread zones. The experiment resulted in a tire 10 that exhibited less abnormal wear than a tire 10 that did not have tread zones with alternating max tan($\delta$) along the rolling tread width 36.

The tire 10 may protect against abnormal wear by incorporating the tread zones with alternating hysteresis across the tread 16 in the lateral direction 28. In addition, sculptural features can be incorporated into the tread 16 to further protect against abnormal tread 16 wear. One such sculptural feature is the sacrificial ribs 40, 42 shown FIG. 2. The sacrificial ribs 40, 42 can be made out of a material with different hysteretic properties than that of the tread zones 18, 20, 22, 92, 94, 96 and 98, or the material making up the sacrificial ribs 40, 42 may have a hysteresis that is the same as one of the tread zones 18, 20, 22, 92, 94, 96 and 98. In FIG. 2, the sacrificial ribs 40, 42 are made of a material different than that of the tread zones and has a different max tan($\delta$) than that of any of the tread zones 18, 20, 22, 92, 94, 96 or 98. The sacrificial ribs 40, 42 are located within the rolling tread width 36 but are not part of the alternating pattern of the max tan($\delta$). However, in other embodiments, one or more of the tread zones 18, 20, 22, 92, 94, 96 or 98 could be located at one or both of the sacrificial ribs 40, 42 so that the sacrificial ribs 40, 42 are part of the alternating max tan($\delta$) sequence as previously described. As such, the sacrificial ribs 40, 42 may or may not be part of the high/low hysteresis alternating sequence that functions to reduce abnormal tread wear.

The sacrificial ribs 40, 42 may have an outer radius less than that of the adjacent shoulder ribs 72, 88 and are within the rolling tread width 36 when the tire 10 is new, and contact the ground when the tire 10 is new and may also contact the ground when the tire 10 wears. The sacrificial ribs 40, 42 are considered to be sacrificial because they inherently have a braking kick-out stress locally that is sensitive to wear. However, it is these very stresses that in turn provide a better stress situation for the adjacent shoulder ribs 72, 88 that they are protecting because the net result is a more driving kick-out situation for these adjacent shoulder ribs 72, 88. A pair of sacrificial ribs 40, 42 are shown on either side of the tread 16 in the lateral direction 28, but it is to be understood that only a single shoulder rib 40, 42 could be present in certain exemplary embodiments. The sacrificial ribs 40, 42 are within the rolling tread width 36 when the tire 10 is new, and upon some wearing of the tread 16 during normal use, the sacrificial ribs 40, 42 will continue to contact the ground as the tire 10 rolls and may provide some protection throughout much of the tire's 10 life.

Figure 3:
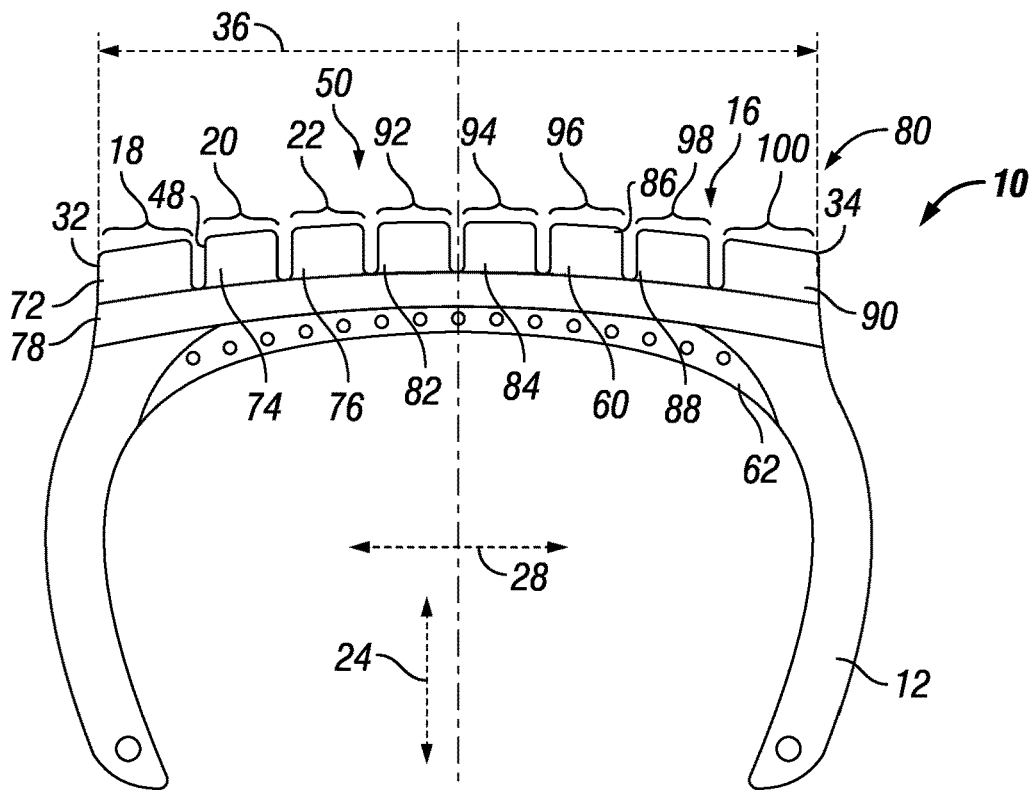
FIG. 3 is a cross-sectional view of the tire in accordance with another exemplary embodiment in which sacrificial ribs are not present.

FIG. 3 illustrates another embodiment of the tire 10, with tread zones of alternating hysteresis, in which the sacrificial ribs 40, 42 are not present. Instead, the first rib 72 is located at the first tread edge 32, and an eighth rib 90 is located at the second tread edge 34. The first tread zone 18 is at the first rib 72 and is consequentially at the first tread edge 32, and an eighth tread zone 100 is at the eighth rib 90 and at the second tread edge 34. The tread zones are all located at ribs and all have alternating hysteresis. In this regard, the max tan($\delta$) of the first tread zone 18, the third tread zone 22, the fifth tread zone 94, and the seventh tread zone 98 are all the same or are within 0.05 of one another. The max tan($\delta$) of the second tread zone 20, the fourth tread zone 92, the sixth tread zone 96 and the eighth tread zone 100 are all the same as one another or close so that they are within a range of 0.05 to one another. The max tan($\delta$) of the tread zones 18, 22, 94, 98 is either higher or lower than the max tan($\delta$) of the tread zones 20, 92, 96, 100. The tread 16 is arranged so the max tan($\delta$) at the first tread edge 32 is different from the max tan($\delta$) at the second tread edge 34.

Figure 4:
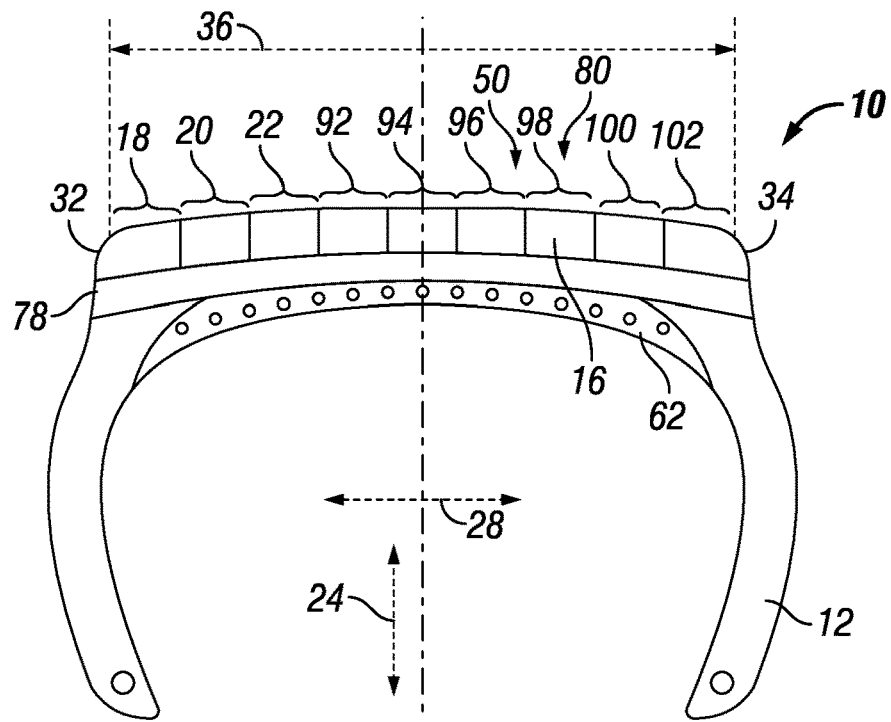
FIG. 4 is a cross-sectional view of the tire in accordance with another exemplary embodiment in which ribs are not present.

Another embodiment of the tread 16 is shown in FIG. 4 in which no ribs 72, 74, 76, 82, 84, 86, 88, 90 or sacrificial ribs 40, 42 are present. The tread 16 may be described as a slick in this embodiment. The tread 16 still includes zones that are located on the undertread layer 78 that have alternating hysteresis values. The zones are different areas of the tread 16 that contact the ground and may extend in the radial direction 24 all the way to the undertread layer 78 or only part way to the undertread layer 78. The zones 18, 20, 22, 92, 94, 96, 98, 100, 102 can be contiguous with one another so that they contact one another in the lateral direction 28 and are not separated by longitudinal grooves or other architectural features of the tire 10. The zones may have the same width as one another in the lateral direction 28, or they may have different widths in the lateral direction 28. The max tan($\delta$) of the first tread zone 18, the third tread zone 22, the fifth tread zone 94, the seventh tread zone 98 and the ninth tread zone 102 are all the same or are close to one another so that all of them are within a 0.05 range. Likewise, the max tan($\delta$) of the second tread zone 20, the fourth tread zone 92, the sixth tread zone 96, and the eighth tread zone 100 are all the same as one another, or again close so that all of them are no more than 0.05 different, and this max tan($\delta$) is either higher or lower than the aforementioned odd numbered tread zones 18, 22, 94, 98 and 102. Again, the tread zone located closest to the first tread edge 32 can have either the higher or lower max tan($\delta$), and the tread zones may alternate therefrom in the lateral direction 28.

Although shown as being incorporated on a casing 12, the tread 16 may be produced as a tread band 16 that is sold and later used in a retreading process of a tire 10. The tread band 16 is attached to a casing 12 once the tread 16 of the casing 12 becomes worn. A portion of such a tread band 16 is shown with reference to FIG. 5. The outer surface 50 of the tread 16 has other types of sculptural features that function to reduce abnormal tread 16 wear. The sculptural feature could be one or more micro sipes 44 that extend from the edge 48 of the rib 74 into the rib 74 in the lateral direction 28, and that extend from the outer surface 50 of the rib 74 into the rib 74 in the radial direction 24. The micro sipes 44 are cuts in the rib 74 and are less than 2 mm in thickness and do not extend across the entire width of the rib 74 in the lateral direction 28. All of the other ribs 72, 76, 82, and 84 may likewise have micro sipes 44, and they can be on both sides of the ribs 72, 76, 82, 84 in the lateral direction 28, except for the shoulder ribs 72 and 84 in which the micro sipes 44 are not present on the first and second tread edges 32, 34. The micro sipes 44 are on the edges 48 of the ribs 72, 74, 76, 82 and 84 to reduce stress singularities that may occur at the rib edges 48. Their local compressive nature helps distribute/absorb this infinite stress resulting in less probability for the tread 16 to initiate irregular wear when compared to ribs 72, 74, 76, 82 and 84 with no micro sipes 44.

Figure 6:
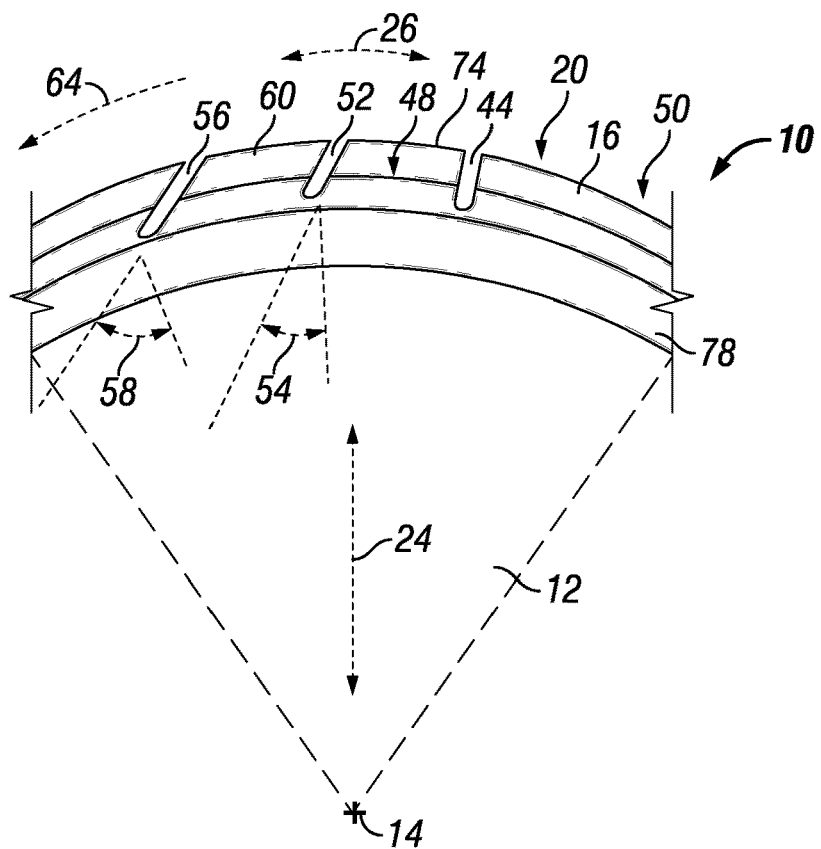
FIG. 6 is a side view taken from inside of a longitudinal groove of the tire in accordance with another exemplary embodiment in which a section of the circumference of the tire is shown.

FIG. 6 shows a micro sipe 44 that extends into the second rib 74. The micro sipe 44 is oriented at a zero degree angle to the central axis 14. Another sculptural feature present may be a directional micro sipe 52 as shown both in FIGS. 5 and 6. The directional micro sipe 52 is the same as the micro sipe 44 save for the fact that it is inclined relative to the central axis 14. The directional micro sipe 52 is oriented at a non-zero angle 54 that can be any amount greater than zero degrees. In some instances, the non-zero angle 54 may be from 2-85 degrees. The directionality of the micro sipe 52 is oriented so that it is angled towards the forward rolling direction 64 of the tire 10. This inclination of the directional micro sipe 52 improves kick-out stresses in the contact patch of the tire 10 which may reduce irregular wear.

Figure 5:
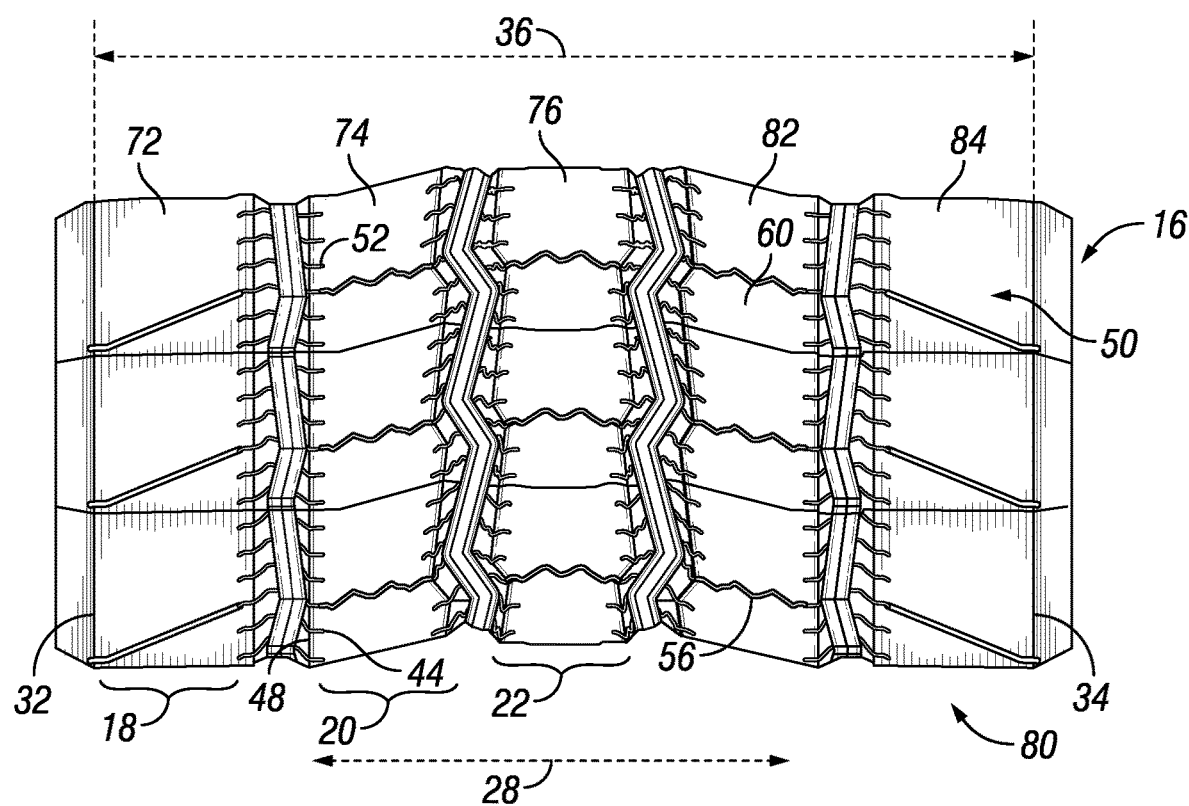
FIG. 5 is a top view of the tread that is a retread band in accordance with another exemplary embodiment.

FIGS. 5 and 6 also illustrate a directional sipe 56 that can be another sculptural feature that is used in conjunction with the alternating hysteresis tread zones to reduce abnormal tread 16 wear. The directional sipe 56 is a groove less than 2 mm in thickness and extends across the entire width of the rib 82 in the lateral direction 28. The directional sipe 56 benefits the rib 82 in boosting driving kick-out, and improves the overall wear speed performance of the tire 10. The sipe 56 is directional in that it is oriented relative to the central axis 14 in the forward rolling direction 64 of the tire 10 to improve kick-out stresses in the contact patch to fight irregular wear. The directional sipe 56 is oriented at an angle 58 to the central axis 14 and is a non-zero angle. Angle 58 may be from 5-85 degrees in accordance with certain exemplary embodiments. Other sipes 56 can be located in any one of or all of the ribs 72, 74, 76, 82 and 84. The various structural elements discussed such as the sacrificial ribs 40, 42, the directional microsipes 52, and the directional sipes 56 may or may not be present in accordance with various embodiments of the tread 16. The use of alternating zones of max tan($\delta$) in the lateral direction 28 may allow for the tuning of the motricity profile locally to tune wear in trouble regions of the tire 10. The use of alternating zones of max tan($\delta$) in the lateral direction 28 may delay the irregular wear signatures seen in tires 10 and can increase the life of the tire 10.

The higher and lower hysteresis of the tread zones is imparted based upon the material making up the tread zones such as the rubber, silica, carbon black, sulfur, or other fillers, and is not higher or lower based upon belts or other components causing the layer to be a tissue. The max tan($\delta$) of the tread zones results from the tread mix, and does not result from the tread being a tissue.

The tire 10 can be an original equipment manufactured tire that is produced and goes onto a new vehicle. The tire 10 may also be a retreaded tire in which a used casing 12 is fitted with a new tread 16 that includes the alternating tread zones 18, 20, 22. The tread 16 may thus be provided as a retread band, or as a tire 10. The tire 10 is a tire used on heavy trucks such as 18 wheelers, garbage trucks, school busses, box trucks, and fire trucks. The tread 16 allows for the provision of steer and trailer tires 10 that do not incorporate sacrificial ribs 40, 42.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A tread for a heavy truck tire, comprising:
an undertread layer that extends in a lateral direction of the tread, wherein the undertread layer has an undertread max tan($\delta$) that is less than a first max tan ($\delta$), a second max tan ($\delta$), a third max tan($\delta$), and a fourth max tan($\delta$), wherein the undertread layer is devoid of belts;
a belt layer that engages the undertread layer and is located closer to a central axis in a radial direction than is the undertread layer;
a plurality of tread zones that are located at different locations in the lateral direction of the tread, wherein a first tread zone of the plurality of tread zones has the first max tan($\delta$), wherein the first tread zone is configured for engaging a road and extends from an outer surface of the tread to an upper end of the undertread layer in the radial direction and engages the undertread layer, wherein materials making up the first tread zone are consistent from the outer surface of the tread to the upper end of the undertread layer such that the first max tan ($\delta$) is present at all points of the first tread zone from the outer surface of the tread to the upper end of the undertread layer;
wherein a second tread zone is located next to the first tread zone in the lateral direction, wherein the second tread zone has the second max tan($\delta$) that is different than the first max tan($\delta$), wherein the second tread zone is configured for engaging the road and extends from the outer surface of the tread to the upper end of the undertread layer in the radial direction and engages the undertread layer, wherein materials making up the second tread zone are consistent from the outer surface of the tread to the upper end of the undertread layer such that the second max tan($\delta$) is present at all points of the second tread zone from the outer surface of the tread to the upper end of the undertread layer;
wherein a third tread zone is located next to the second tread zone in the lateral direction such that the second tread zone is located between the first and third tread zones in the lateral direction, wherein the third tread zone has the third max tan($\delta$) that is different than the second max tan($\delta$), wherein the third tread zone is configured for engaging the road and extends from the outer surface of the tread to the upper end of the undertread layer in the radial direction and engages the undertread layer, wherein materials making up the third tread zone are consistent from the outer surface of the tread to the upper end of the undertread layer such that the third max tan ($\delta$) is present at all points of the third tread zone from the outer surface of the tread to the upper end of the undertread layer;
wherein a fourth tread zone is located next to the third tread zone in the lateral direction, wherein the fourth tread zone has the fourth max tan($\delta$) that is different than the first max tan($\delta$) and that is the same as the second max tan($\delta$), wherein the fourth tread zone is configured for engaging the road and extends from the outer surface of the tread to the upper end of the undertread layer in the radial direction and engages the undertread layer, wherein materials making up the fourth tread zone are consistent from the outer surface of the tread to the upper end of the undertread layer such that the fourth max tan($\delta$) is present at all points of the fourth tread zone from the outer surface of the tread to the upper end of the undertread layer;

wherein the first max tan($\delta$), the second max tan($\delta$), the third max tan($\delta$), and the fourth max tan($\delta$) are all within the range from 0.09-0.13;

wherein the third max tan($\delta$) is the same as the first max tan($\delta$);

wherein either [the first max tan($\delta$) is greater than the second max tan($\delta$)] or [the second max tan($\delta$) is greater than the first max tan($\delta$)];

wherein if the first max tan ($\delta$) is greater than the second max tan ($\delta$) then the third max tan($\delta$) is greater than the second max tan($\delta$), and wherein if the first max tan($\delta$) is less than the second max tan($\delta$) then the third max tan($\delta$) is less than the second max tan($\delta$);

a first longitudinal groove located between the first tread zone and the second tread zone in the lateral direction, wherein the first longitudinal groove does not extend into the undertread layer in the radial direction such that entire sidewalls of the first longitudinal groove are formed by the first tread zone and the second tread zone and not the undertread layer;

a second longitudinal groove located between the second tread zone and the third tread zone in the lateral direction, wherein the second longitudinal groove does not extend into the undertread layer in the radial direction such that entire sidewalls of the second longitudinal groove are formed by the second tread zone and the third tread zone and not the undertread layer;

a third longitudinal groove located between the third tread zone and the fourth tread zone in the lateral direction, wherein the third longitudinal groove does not extend into the undertread layer in the radial direction such that entire sidewalls of the third longitudinal groove are formed by the third tread zone and the fourth tread zone and not the undertread layer, and such that the undertread layer forms the bottom of the third longitudinal groove.

2. The tread as set forth in claim 1, wherein the first tread zone has a complex shear modulus for 25% strain (G*25) at 60° C. that is from 1.10 MPa to 2.30 MPa, wherein the second tread zone has a complex shear modulus for 25% strain (G*25) at 60° C. that is from 1.10 MPa to 2.30 MPa, and wherein the third tread zone has a complex shear modulus for 25% strain (G*25) at 60° C. that is from 1.10 MPa to 2.30 MPa.

3. The tread as set forth in claim 2, wherein the first tread zone has a complex shear modulus for 25% strain (G*25) at 60° C. that is from 1.24 MPa to 2.29 MPa, wherein the second tread zone has a complex shear modulus for 25% strain (G*25) at 60° C. that is from 1.24 MPa to 2.29 MPa, and wherein the third tread zone has a complex shear modulus for 25% strain (G*25) at 60° C. that is from 1.24 MPa to 2.29 MPa.

4. The tread as set forth in claim 1, wherein the first tread zone, the second tread zone, and the third tread zone each have a complex shear modulus for 25% strain (G*25) at 60° C. that are within 0.10 MPa of one another.

5. The tread as set forth in claim 1, wherein the first tread zone is a sacrificial rib, wherein the sacrificial rib is located at a first tread edge of the tread in the lateral direction.

6. The tread as set forth in claim 1, wherein the tread has a sacrificial rib that is located on a first tread edge of the tread in the lateral direction, wherein the first tread zone is adjacent the sacrificial rib such that the first tread zone is located between the sacrificial rib and the second tread zone in the lateral direction, wherein the sacrificial rib has a sacrificial rib max tan($\delta$) that is the same as or less than the lowest max tan($\delta$) of the first max tan($\delta$), the second max tan($\delta$), or the third max tan($\delta$).

7. The tread as set forth in claim 1, wherein the first tread zone is a first rib of the tire, wherein the second tread zone is a second rib of the tire, and wherein the third tread zone is a third rib of the tire.

8. The tread as set forth in claim 1, wherein the tread has a rolling tread width that extends along the lateral direction of the tread, wherein the first tread zone, the second tread zone, and the third tread zone are located in the rolling tread width, wherein the tread has a series of additional tread zones in the rolling tread width located next to one another in the lateral direction such that their max tan($\delta$) alternate in the lateral direction across the rolling tread width, wherein the max tan($\delta$) of the additional tread zones are either equal to the first max tan($\delta$) or the second max tan($\delta$).

9. The tread as set forth in claim 1, wherein the tread is a retread band.

* * * * *